US011973390B2

(12) United States Patent
Kim et al.

(10) Patent No.: US 11,973,390 B2
(45) Date of Patent: Apr. 30, 2024

(54) ACTUATOR HAVING DRIVING PIN WITH RECTILINEAR MOVEMENT AND AN ELASTIC MEMBER OUTSIDE OF HOUSING

(71) Applicant: HYOSUNG HEAVY INDUSTRIES CORPORATION, Seoul (KR)

(72) Inventors: Do Jin Kim, Changwon-si (KR); Dong Joon Sim, Anyang-si (KR); Sung Ho Lee, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 249 days.

(21) Appl. No.: 17/420,316

(22) PCT Filed: Dec. 30, 2019

(86) PCT No.: PCT/KR2019/018748
§ 371 (c)(1),
(2) Date: Jul. 1, 2021

(87) PCT Pub. No.: WO2020/149551
PCT Pub. Date: Jul. 23, 2020

(65) Prior Publication Data
US 2022/0094252 A1 Mar. 24, 2022

(30) Foreign Application Priority Data

Jan. 18, 2019 (KR) .......................... 10-2019-0007004

(51) Int. Cl.
*H02K 33/06* (2006.01)
(52) U.S. Cl.
CPC .................................... *H02K 33/06* (2013.01)

(58) Field of Classification Search
CPC .. H02K 7/1869; H02K 7/1876; H02K 7/1892; H02K 33/00; H02K 33/02;
(Continued)

(56) References Cited

U.S. PATENT DOCUMENTS

| 1,062,361 | A | * | 5/1913 | Ryder | .................... H02K 33/16 |
|---|---|---|---|---|---|
| | | | | | 123/149 H |
| 2,797,913 | A | * | 7/1957 | Moulton | .................... F02D 1/00 |
| | | | | | 73/514.39 |

(Continued)

FOREIGN PATENT DOCUMENTS

| CN | 203339921 U | 12/2013 |
|---|---|---|
| CN | 103779994 A | 5/2014 |

(Continued)

OTHER PUBLICATIONS

KR1020050047671 English Translation (Year: 2015).*

*Primary Examiner* — Maged M Almawri
(74) *Attorney, Agent, or Firm* — NKL Law; Jae Youn Kim

(57) ABSTRACT

An actuator is proposed. A housing and a housing cap constitute an exterior of the actuator, and a driving pin is installed by passing through an inner space of the housing such that the driving pin moves rectilinearly. A permanent magnet and an outer iron core are stacked and installed at the inner surface of the housing, that is, in the inner space. The permanent magnets and the outer iron core are stacked such that a set of permanent magnet and outer iron core in which the permanent magnet is stacked at each of opposite sides of one outer iron core.

9 Claims, 5 Drawing Sheets

(58) Field of Classification Search
CPC ...... H02K 33/16; H02K 7/1884; H02K 35/02;
G06F 3/016; G06F 3/03545; F02B 71/06;
F02B 63/041; F02B 71/04
USPC ... 310/25, 15, 12.01, 12.31, 28–30, 40 MM,
310/14, 12.17, 35, 34, 12.23, 12.12;
417/11, 56, 258, 398–403
See application file for complete search history.

(56) References Cited

U.S. PATENT DOCUMENTS

| | | | | |
|---|---|---|---|---|
| 2,906,898 A * | 9/1959 | Missien | ............... | B25D 11/064 310/30 |
| 3,017,546 A * | 1/1962 | Bates | .................... | H01F 7/1607 335/264 |
| 3,070,715 A * | 12/1962 | Widmer | ............... | H01F 7/1607 310/14 |
| 3,181,188 A * | 5/1965 | Moret | .................... | H02K 7/145 200/293.1 |
| 3,491,319 A * | 1/1970 | Cox | ....................... | H02K 41/00 335/259 |
| 4,240,056 A * | 12/1980 | Mayer | ................... | H01F 7/1638 335/267 |
| 4,331,277 A * | 5/1982 | Green | ................ | A61B 17/0684 227/19 |
| 4,488,477 A * | 12/1984 | Miyamoto | ............ | F15B 15/086 92/255 |
| 4,526,518 A * | 7/1985 | Wiernicki | ............. | F02M 37/08 417/420 |
| 4,920,288 A * | 4/1990 | den Heijer | ................ | F25B 9/14 310/90 |
| 5,695,471 A * | 12/1997 | Wampler | ............ | A61M 60/237 417/423.1 |
| 5,924,975 A * | 7/1999 | Goldowsky | ......... | A61M 60/148 600/16 |
| 6,157,277 A * | 12/2000 | Bulgatz | ..................... | H01F 7/06 335/220 |
| 6,227,820 B1 * | 5/2001 | Jarvik | ................. | F04D 13/0646 417/423.12 |
| 6,234,772 B1 * | 5/2001 | Wampler | .............. | F04D 29/048 417/423.1 |
| 6,326,706 B1 * | 12/2001 | Zhang | ................... | F04B 35/045 310/12.32 |
| 6,447,266 B2 * | 9/2002 | Antaki | ..................... | H02K 7/09 604/131 |
| 6,688,861 B2 * | 2/2004 | Wampler | ............. | A61M 60/232 417/423.1 |
| 6,983,923 B2 * | 1/2006 | Fukui | .................... | F16K 31/082 335/229 |
| 7,078,832 B2 * | 7/2006 | Inagaki | .................... | H02K 7/14 335/238 |
| 7,218,018 B2 * | 5/2007 | Hasegawa | ............. | H02K 33/16 310/12.33 |
| 7,288,085 B2 * | 10/2007 | Olsen | ............... | A61M 5/14216 604/151 |
| 7,449,803 B2 * | 11/2008 | Sahyoun | ................ | H02K 33/16 310/23 |
| 7,495,358 B2 * | 2/2009 | Kobayashi | ......... | A61C 17/3445 310/15 |
| 7,504,794 B2 * | 3/2009 | Sato | ................... | H02K 41/0356 318/135 |
| 7,576,454 B2 * | 8/2009 | Cheung | ............... | H02K 41/0356 310/14 |
| 7,695,253 B2 * | 4/2010 | Yang | ..................... | F04B 43/043 417/322 |
| 8,013,480 B2 * | 9/2011 | Bang | ...................... | B06B 1/045 310/12.33 |
| 8,097,991 B2 * | 1/2012 | Masami | .................. | H02K 33/16 310/15 |
| 8,327,488 B2 * | 12/2012 | Takahashi | ............. | H02K 33/16 15/23 |
| 8,587,162 B2 * | 11/2013 | Kagami | ................. | A61C 17/32 310/38 |
| 8,643,228 B2 * | 2/2014 | Vogel | ................ | G02B 23/2476 310/12.24 |
| 9,419,507 B2 * | 8/2016 | Takahashi | .......... | A61C 17/3481 |
| 9,692,286 B2 * | 6/2017 | Endo | ....................... | H02K 33/16 |
| 9,692,287 B2 * | 6/2017 | Yamamoto | ............. | H02K 35/02 |
| 9,746,211 B2 * | 8/2017 | Barclay | ..................... | F25J 1/001 |
| 9,906,109 B2 * | 2/2018 | Endo | ....................... | H02K 33/16 |
| 9,906,113 B2 * | 2/2018 | Iwaki | ........................ | H02K 7/08 |
| 10,299,901 B2 * | 5/2019 | Wills | ................... | A61C 17/3418 |
| 10,507,092 B2 * | 12/2019 | Bax | ............................ | A61C 17/34 |
| 10,566,888 B2 * | 2/2020 | Degner | .................. | H02K 33/18 |
| 10,674,278 B2 * | 6/2020 | Zhou | ........................ | H04R 9/025 |
| 11,258,343 B2 * | 2/2022 | Harrison | ................ | H02K 33/00 |
| 2002/0159233 A1 * | 10/2002 | Patel | ................... | H05K 7/20727 361/702 |
| 2002/0195884 A1 * | 12/2002 | Ichii | ........................ | A61C 17/34 310/15 |
| 2003/0185000 A1 * | 10/2003 | Mah | ....................... | H02K 35/02 362/192 |
| 2005/0088842 A1 * | 4/2005 | Mah | ........................ | H02J 7/0045 362/157 |
| 2005/0151375 A1 * | 7/2005 | Cheung | .................. | B60C 23/041 290/1 R |
| 2005/0212363 A1 | 9/2005 | Okubo | | |
| 2006/0168745 A1 * | 8/2006 | Kobayashi | ......... | A61C 17/3445 15/22.1 |
| 2007/0052302 A1 * | 3/2007 | Cheung | .................. | B82Y 25/00 310/12.25 |
| 2007/0212237 A1 * | 9/2007 | Zhao | ........................ | F04B 39/12 417/415 |
| 2008/0115664 A1 * | 5/2008 | Minowa | ................. | F15B 15/086 92/169.1 |
| 2009/0051471 A1 * | 2/2009 | Zhao | ....................... | H01F 7/1607 335/261 |
| 2009/0191073 A1 * | 7/2009 | Kopecek | .................. | F04B 17/04 417/415 |
| 2009/0218894 A1 * | 9/2009 | Aso | ....................... | F16C 29/0685 310/12.31 |
| 2010/0277012 A1 * | 11/2010 | Kobayashi | ........... | H02K 7/1884 310/30 |
| 2011/0020156 A1 * | 1/2011 | Van Brunt | ............. | H02K 33/16 417/487 |
| 2011/0057629 A1 * | 3/2011 | Lin | ......................... | H02K 35/02 322/3 |
| 2011/0133577 A1 * | 6/2011 | Lee | ......................... | H02K 33/18 310/15 |
| 2011/0169347 A1 * | 7/2011 | Miyamoto | .............. | G06F 3/016 310/12.21 |
| 2011/0198949 A1 * | 8/2011 | Furuich | .................. | H02K 33/16 310/25 |
| 2012/0062047 A1 * | 3/2012 | Nakagawa | ............ | H02K 33/16 310/17 |
| 2012/0086213 A1 * | 4/2012 | Chan | ...................... | H02K 7/088 310/90 |
| 2012/0112570 A1 * | 5/2012 | Le Besnerais | ........... | H02K 1/20 310/54 |
| 2012/0119593 A1 * | 5/2012 | Yajima | .................... | H02K 41/031 310/12.21 |
| 2013/0010999 A1 * | 1/2013 | Lastrucci | ............... | H02K 33/16 381/400 |
| 2014/0035397 A1 * | 2/2014 | Endo | ....................... | H02K 33/18 310/30 |
| 2014/0062224 A1 * | 3/2014 | Kim | ....................... | H02K 33/16 310/15 |
| 2014/0062225 A1 * | 3/2014 | Kim | ....................... | H02K 33/00 310/15 |
| 2014/0084710 A1 * | 3/2014 | Endo | ....................... | H02K 33/16 310/25 |
| 2014/0147305 A1 * | 5/2014 | Johansson | ............... | H02K 49/102 417/410.1 |
| 2014/0265651 A1 * | 9/2014 | Kim | ....................... | H02K 33/16 310/25 |
| 2015/0206639 A1 * | 7/2015 | Odajima | ................. | B06B 1/045 335/235 |
| 2016/0094115 A1 * | 3/2016 | Okawa | ................ | A61C 17/3445 310/25 |

(56) References Cited

U.S. PATENT DOCUMENTS

| | | | | |
|---|---|---|---|---|
| 2016/0252081 A1* | 9/2016 | Jones | ................... | F04B 19/22 |
| | | | | 417/406 |
| 2016/0285393 A1* | 9/2016 | Vincent | ................. | H02N 2/188 |
| 2017/0070131 A1* | 3/2017 | Degner | ................. | H02K 33/00 |
| 2017/0216884 A1* | 8/2017 | Katada | ................... | H02K 33/02 |
| 2017/0250596 A1* | 8/2017 | Son | .......................... | H02K 1/34 |
| 2018/0038363 A1* | 2/2018 | Trethewey | ............. | F04B 43/04 |
| 2018/0056329 A1* | 3/2018 | Akanuma | .............. | H02K 33/16 |
| 2018/0212487 A1* | 7/2018 | Jiang | ..................... | H02K 33/16 |
| 2018/0219465 A1* | 8/2018 | Katada | ................... | B06B 1/045 |
| 2018/0250107 A1* | 9/2018 | Dai | ..................... | H02K 1/2791 |
| 2019/0107312 A1* | 4/2019 | Noh | ........................ | F04B 19/04 |
| 2019/0160443 A1* | 5/2019 | Cauley, III | ........... | B01F 35/212 |
| 2019/0366383 A1* | 12/2019 | Yoshimura | ............. | F16F 1/328 |
| 2021/0384810 A1* | 12/2021 | Shirato | ................. | H02K 33/18 |

FOREIGN PATENT DOCUMENTS

| | | | | |
|---|---|---|---|---|
| JP | 60-236201 A | 11/1985 | | |
| JP | 09-503379 A | 3/1997 | | |
| JP | 2000023442 A | 1/2000 | | |
| KR | 10-2003-0064410 A | 7/2003 | | |
| KR | 10-2005-0047671 A | 5/2005 | | |
| KR | 1020050047671 | * 5/2005 | ............ | B06B 1/045 |
| KR | 10-2011-0108492 A | 10/2011 | | |
| KR | 10-1552573 B1 | 9/2015 | | |
| KR | 101552573 B1 * | 9/2015 | | |
| WO | 2013007403 A1 | 1/2013 | | |

* cited by examiner

ACTUATOR HAVING DRIVING PIN WITH RECTILINEAR MOVEMENT AND AN ELASTIC MEMBER OUTSIDE OF HOUSING

TECHNICAL FIELD

The present disclosure relates generally to an actuator. More particularly, the present disclosure relates to an actuator in which a rectilinear movement of a driving pin is performed by using a permanent magnet and a coil.

BACKGROUND ART

In actuators, there is a type of actuator which uses a voice coil to drive a driving pin. The actuator using the voice coil is driven in a principle in which force (Lorentz force) is generated in a conducting wire when electric current flows through the conducting wire in a magnetic field.

That is, when the strength of the magnetic field is B, electric current flowing in the conducting wire is i, and the entire length of the conducting wire inside the magnetic field is L, force F generated in the conducting wire is expressed by the following equation.

$$F=BiL(N)$$

Here, the force generated in the conducting wire is directed perpendicularly to electric current flowing in the magnetic field and the conducting wire. The direction of the force can be explained by Fleming's left hand rule, and the force is proportional to the winding number n of a coil and thus may be expressed by the following equation.

$$F=nBiL(N)$$

As can be seen from this equation, a force generated in the conducting wire, that is, force for driving a pin is proportional to electric current i, a winding number n, and length L of a conducting wire.

Accordingly, to increase force for driving a pin when designing the actuator, the electric current i, the winding number n, and the length L of the conducting wire are required to be increased. In this case, there occurs a problem that the size of the actuator is increased.

In addition, in a conventional technology, a bobbin is installed at the driving pin, and a coil is installed at the bobbin, so the driving pin, together with the bobbin, is rectilinearly moved by interaction between the coil and a permanent magnet installed in the housing. However, when the bobbin is used, gaps occur between the inner surface of the bobbin and the permanent magnet and between the outer surface of the bobbin and the housing, so the entire size of the actuator is increased and tolerance management in which these gaps are required to be constant is difficult.

DISCLOSURE

Technical Problem

The present disclosure has been made keeping in mind the above problems occurring in the prior art, and the present disclosure is intended to propose an actuator in which a permanent magnet and a coil which are used may be efficiently arranged to maximize the generation of a thrust.

In addition, the present disclosure is intended to propose a miniaturized actuator in which a bobbin is not used.

Furthermore, the present disclosure is intended to propose an actuator in which tolerance management is facilitated.

Technical Solution

In order to accomplish the above objectives, according to an aspect of the present disclosure, an actuator of present disclosure includes: a housing having an inner space defined therein; a driving pin installed at a center of the housing by passing therethrough such that the driving pin moves rectilinearly; an inner iron core installed at the driving pin and moving integrally with the driving pin when the driving pin moves; a coil installed at the inner iron core and moving integrally with the driving pin; a permanent magnet installed in the inner space of the housing and generating magnetism; and an outer iron core forming a flow path of a magnetic flux coming from the permanent magnet in cooperation with the inner iron core, the outer iron core installed in the inner space such that the outer iron core faces the coil installed at the driving pin by being spaced apart by a predetermined distance from the coil.

The inner iron core may be installed in a pin groove formed at an outer surface of the driving pin, and the coil may be installed at an outer surface of the inner iron core.

A guide may be provided in the housing such that the guide guides the movement of the driving pin.

A housing cap may be installed at an end part of the housing such that the housing cap shields the inner space from outside.

A washer may be installed at the driving pin protruding to the outside of the housing cap, and an elastic member may be installed between the washer and the housing cap such that the elastic member supplies an elastic restoring force to the driving pin when an electric current is not applied to the coil.

In the outer iron core and the permanent magnet, a set of permanent magnet and outer iron core in which the permanent magnet is provided at each of opposite sides of the outer iron core may be repeatedly installed, and an outer iron core may be located at an end part of each of opposite sides at which the outer iron cores and the permanent magnets are arranged by being stacked.

The magnetic flux generated from the permanent magnet located at each of the opposite sides of the outer iron core may pass through the coil facing the outer iron core.

Advantageous Effects

An actuator according to the present disclosure may obtain the following effects.

In the present disclosure, a permanent magnet may be installed at each of the opposite sides of one iron core, and the coil may be installed to face the iron core such that two magnetic paths are simultaneously formed in the coil so as to increase the strength of the magnetic field, thereby increasing force acting on the coil and increasing a thrust by which a driving pin is operated.

In the present disclosure, the iron core and the coil may be installed at the driving pin, and the permanent magnet may be installed at the inner surface of the housing such that the permanent magnet faces the coil, whereby the driving pin may be rectilinearly moved by interaction between the coil and the permanent magnet. Accordingly, a separate bobbin is not used, and the coil may be installed at the driving pin, thereby reducing the number of parts and miniaturizing the actuator.

In addition, the inner iron core and the coil may be installed at the driving pin, and the permanent magnet and the outer iron core may be installed at the inner surface of the housing, so only one gap to be managed may occur between the permanent magnet corresponding to a fixed part and the coil corresponding to a moving part, thereby reducing tolerances to be managed and facilitating assembly work.

MODE FOR INVENTION

Figure 1:
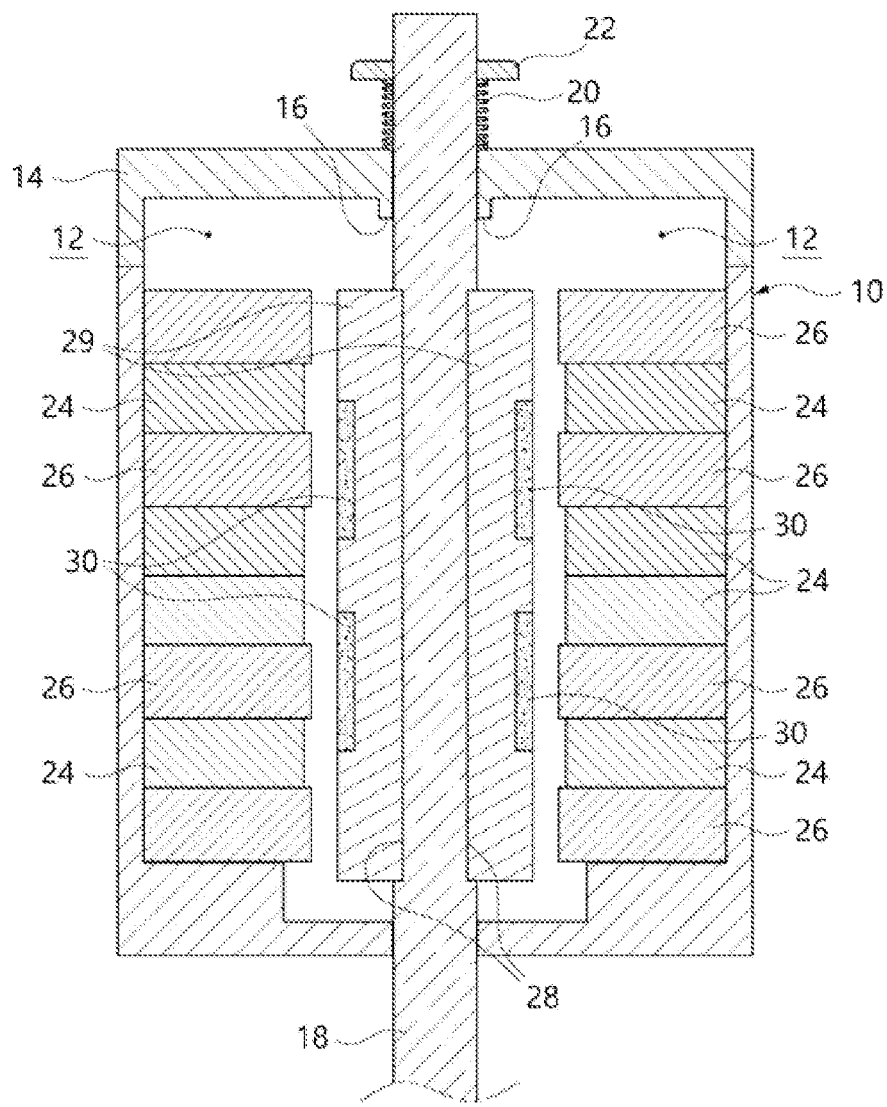
FIG. 1 is a sectional view illustrating configuration of an actuator according to an exemplary embodiment of the present disclosure.

Hereinafter, an embodiment of the present disclosure will be described in detail with reference to the accompanying drawings. In giving reference numerals to components of each drawing, it should be noted that the same components are given the same reference numerals as many as possible although they are indicated on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of an actuator of the present disclosure according to the embodiment, terms such as first, second, A, B, (a), (b), etc. may be used. These terms are only for distinguishing the components from other components, and the essence or order of the components are not limited by the terms. When it is described that a component is "connected", "coupled", or "bonded" to another component, it should be understood that the component may be directly connected or bonded to the other component, but another component may be provided between each component to be connected or bonded thereto.

As illustrated in the drawings, the exterior of an actuator of the present disclosure may be constituted by a housing 10. The housing 10 may have an approximate cylindrical shape and may have a cylindrical inner space 12 defined in the housing 10. The inner space 12 of the housing 10 may be shielded by a housing cap 14. In fact, the housing cap 14 may also be considered a part of the housing 10. Any material capable of maintaining the strength of the exterior of the actuator is suitable for the material of the housing 10. The material of the housing cap 14 is the same as the material of the housing 10, but is not limited thereto. For example, it is recommended that the housing 10 and the housing cap 14 are made of as light a material as possible to reduce the overall weight of the actuator. A light material such as synthetic resin or aluminum is preferably used as the material of the housing 10.

A guide 16 guiding the rectilinear movement of the driving pin 18 to be described below may be formed to be integrated with the housing 10 and the housing cap 14. In the illustrated embodiment, the guide 16 is formed only at the housing cap 14, but the guide 16 may be formed to be integrated with a portion of the housing 10 through which the driving pin 18 passes.

The driving pin 18 may be installed by passing through the housing 10. The driving pin 18 may be configured such that the driving pin 18 has opposite end parts thereof exposed to the outside by passing through the housing 10 and the housing cap 14. However, an end part of the driving pin 18 may not be exposed to the outside at a side of the housing cap 14 such that the end part of the driving pin 18 is supported by the housing cap 14. It is preferable that the driving pin 18 is made of a light material for easy movement. The driving pin 18 may be made of aluminum as an example. The driving pin 18 may perform a rectilinear reciprocating motion into and out of the housing 10 by being guided by the guide 16.

A first end part of the driving pin 18 may be connected to a side at which the driving force of the actuator is used. An elastic member 20 may be installed at a second end part of the driving pin 18 and may supply elastic force to the driving pin 18 when the driving pin 18 returns to an initial position after protruding to the outside of the housing 10. A first end part of the elastic member 20 may be supported by the housing 10, more specifically, by the housing cap 14, and a second end part of the elastic member 20 may be supported by a washer 22 installed at the driving pin 18, so the elastic member 20 may supply elastic force to the driving pin 18.

The permanent magnet 24 and an outer iron core 26 may be installed in the inner space 12 of the housing 10. In the embodiment of the present disclosure, the permanent magnet 24 and the outer iron core 26 may all be configured to have ring shapes. The permanent magnet 24 and the outer iron core 26 may be fixed to the housing 10 by fixing the outer iron core 26 located at the uppermost side relative to the drawing to the housing 10. That is, the outer iron core 26 located at the uppermost side may be fixed to the housing 10 while pressing permanent magnets 24 and outer iron cores 26 located under the outer iron core 26 located at the uppermost side, so the entirety of the permanent magnets 24 and the outer iron cores 26 may be fixed to the housing 10.

In the embodiment of the present disclosure, the outer iron core 26 and the permanent magnet 24 may be installed in the following manner. Two permanent magnets 24 may be stacked approximately at a middle of the driving pin 18 in a longitudinal direction thereof, and an outer iron core 26 and a permanent magnet 24 may be sequentially positioned at the upper and lower sides, respectively. An outer iron core 26 may be located at each of the highest and lowest ends relative to the drawing. That is, in the present disclosure, a set of permanent magnet and outer iron core in which a permanent magnet 24 is provided at each of the opposite sides of one outer iron core 26 may be repeatedly installed, and an outer iron core 26 may be located at each of opposite end parts of a structure in which the outer iron cores 26 and the permanent magnets 24 are stacked.

Here, the polarity of each of the permanent magnets 24 is arranged as illustrated in the drawing, so the driving pin 18 may move downward relative to the drawing and then move upward again. The outer iron core 26 may form a magnetic path through which the magnetic flux coming from the permanent magnet 24 flows.

The inner iron core 29 and the coil 30 may be installed at the driving pin 18. In the illustrated embodiment, a pin groove 28 may be formed at the outer surface of the driving pin 18 by surrounding the driving pin 18 such that the pin groove 28 has a predetermined depth. The inner iron core 29 may be installed in the pin groove 28. The inner iron core 29 may also be made to have a ring shape. Due to the installation of the inner iron core 29 in the pin groove 28, the inner iron core 29 may not move relative to the driving pin 18 during the rectilinear movement of the driving pin 18. Of course, the pin groove 28 may not be formed at the driving pin 18, but a key or washer may be installed at the opposite ends of the driving pin 18 such that the inner iron core 29 is fixed to the driving pin 18.

The coil 30 may be installed at the outer surface of the inner iron core 29 by surrounding the outer surface. The coil 30 may be installed to face the outer iron core 26 by being spaced apart by a predetermined distance therefrom. The coil 30 may be installed by surrounding the outer circumferential surface of the inner iron core 29. It is recommended that the coil 30 is installed in a groove formed in the inner iron core 29. The exterior of the coil 30 may be an approximate ring shape. In the embodiment of the present disclosure, two coils 30 are provided, but are not required. At least one coil 30 may be located at a position corresponding to the position of the outer iron core 26.

The coil 30 may be installed such that a center portion of the coil 30 in a height direction thereof is located at the same position as the position of a center portion of the outer iron core 26 in a height direction thereof facing the coil 30 relative to FIG. 1. That is, the coil 30 and the outer iron core 26 facing the coil 30 may have at least the same sizes in the height direction relative to FIG. 1 such that the magnetic flux transmitted through the outer iron core 26 passes through the entirety of the coil 30. Of course, the size of the coil 30 in the height direction thereof may be larger than the size of the outer iron core 26 in the height direction thereof.

Figure 2:
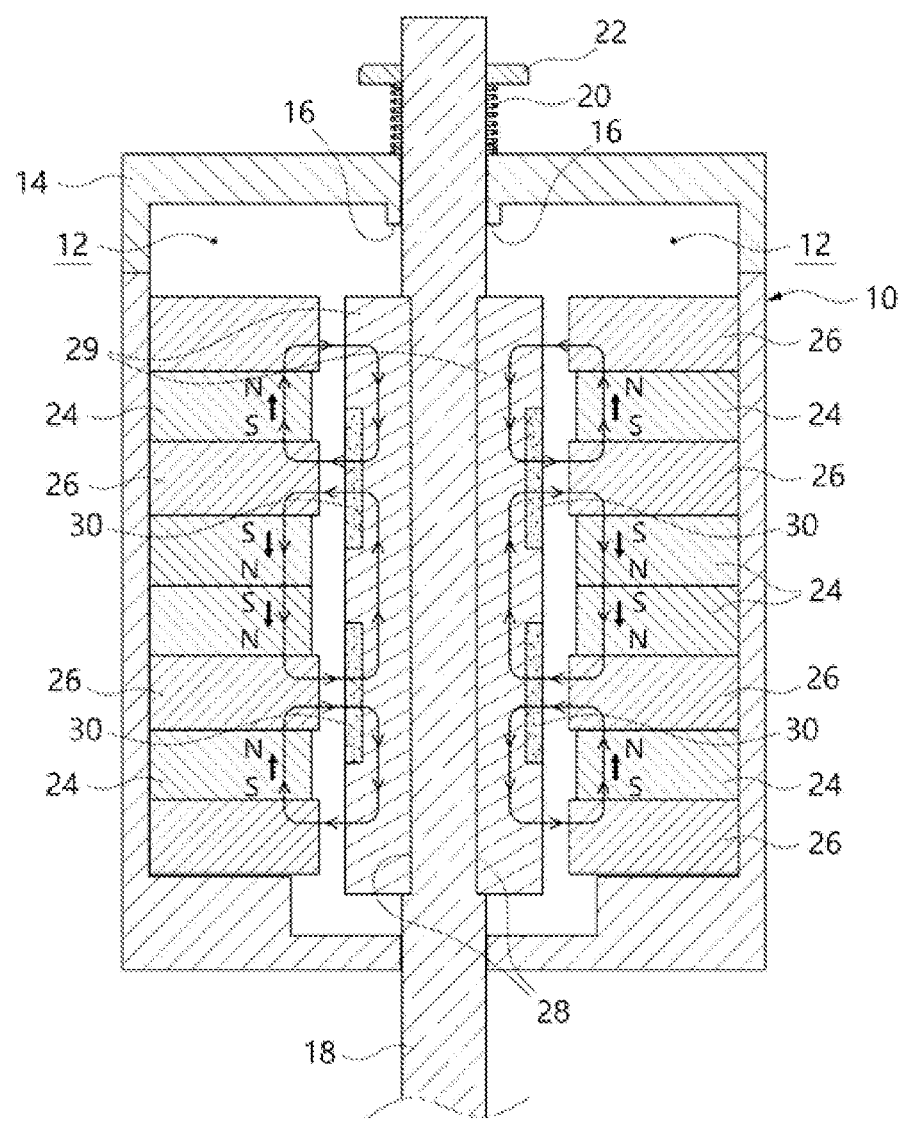
FIG. 2 is a sectional view illustrating a relation between a permanent magnet and a coil constituting the actuator according to the embodiment of the present disclosure.

Accordingly, the coil 30 may be located at a position corresponding to the outer iron core 26 to make a path in which the magnetic flux formed by the permanent magnet 24 passes through the outer iron core 26, through the inner iron core 29, through the coil 30, through another outer iron core 26, and flows back to the permanent magnet 24. Such a path is illustrated in FIG. 2. In the present disclosure, two magnetic paths may be formed in one coil 30 such that the amount of the magnetic flux passing through the coil 30 is relatively increased.

Hereinafter, the use of the actuator having the configuration described above according to the present disclosure will be described in detail.

Figure 4:
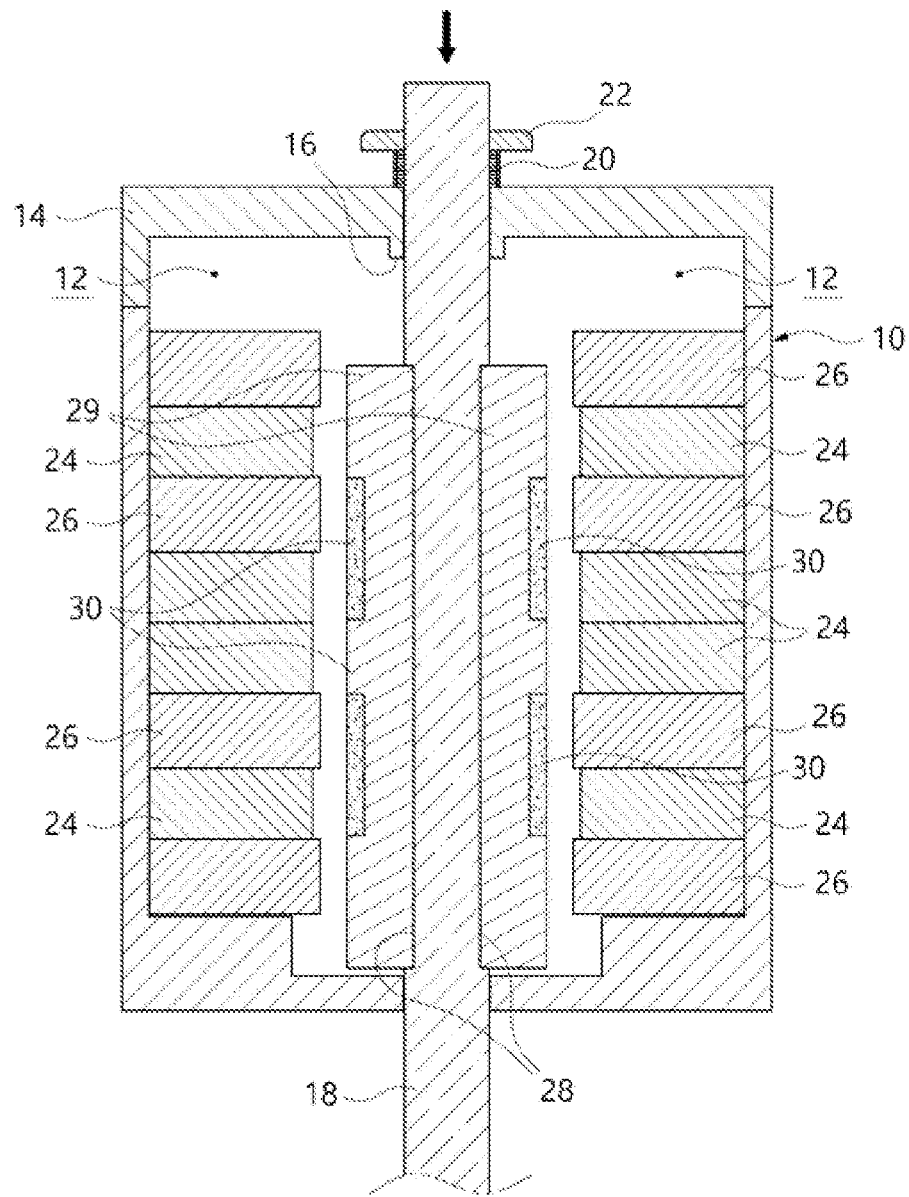
FIG. 4 is a sectional view illustrating a state of the driving pin protruding from a housing in the embodiment of the present disclosure.

In the present disclosure, a force of moving the coil 30 in the magnetic field according to Fleming's left hand rule may be generated by causing an electric current to flow through the coil 30 such that the driving pin 18 is moved. That is, the driving pin 18 may protrude a predetermined length further outward from the housing 10. Such a state is illustrated in FIG. 4.

Figure 5:
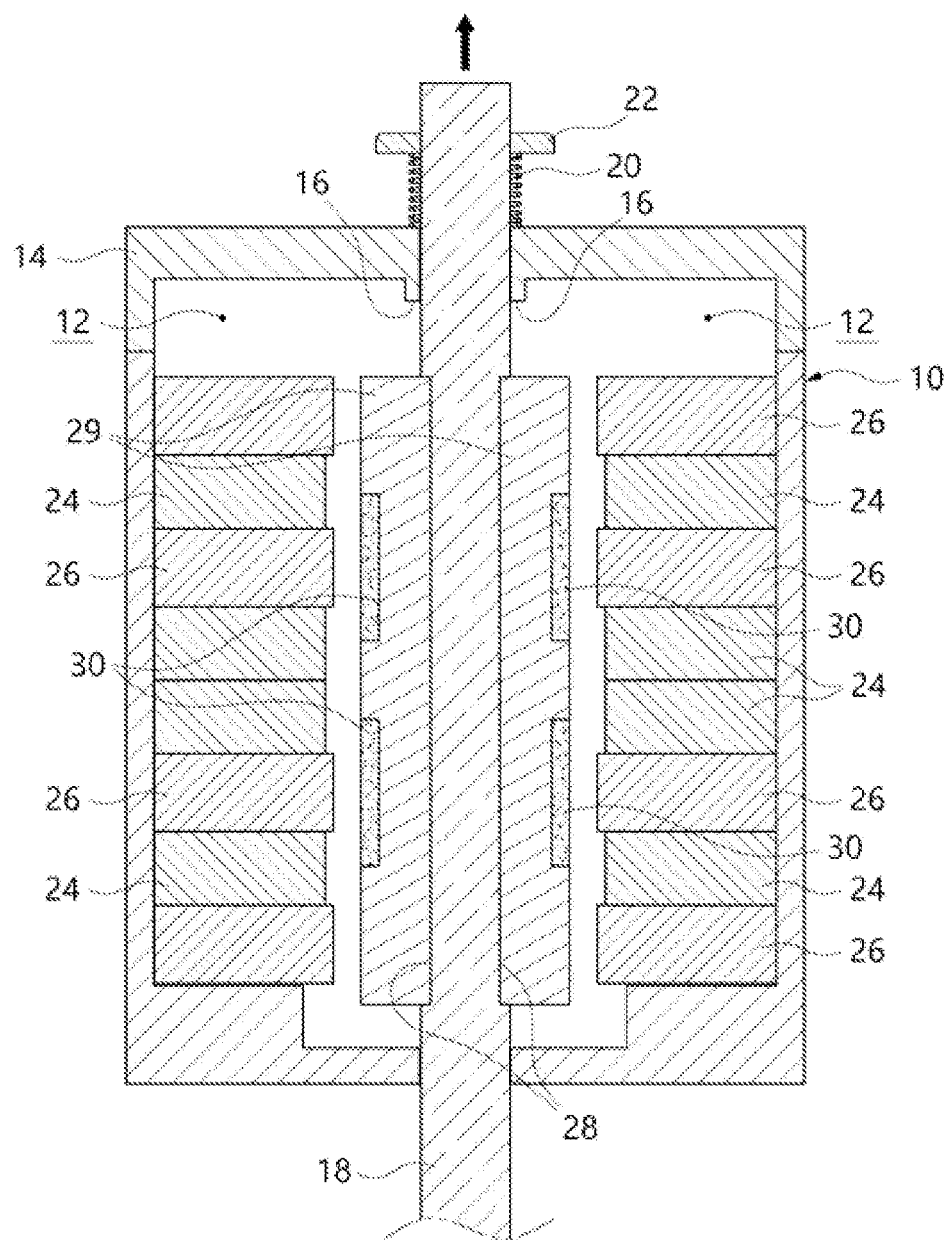
FIG. 5 is a sectional view illustrating a state in which the driving pin is received in the housing in the embodiment of the present disclosure.

In addition, when the electric current applied to the coil 30 is removed, the driving pin 18 may be moved to an initial position by the restoring force of the elastic member 20. By performing such an operation, the actuator causes a desired part to be driven. A state in which the driving pin 18 is moved to an initial position is illustrated in FIG. 5.

Figure 3:
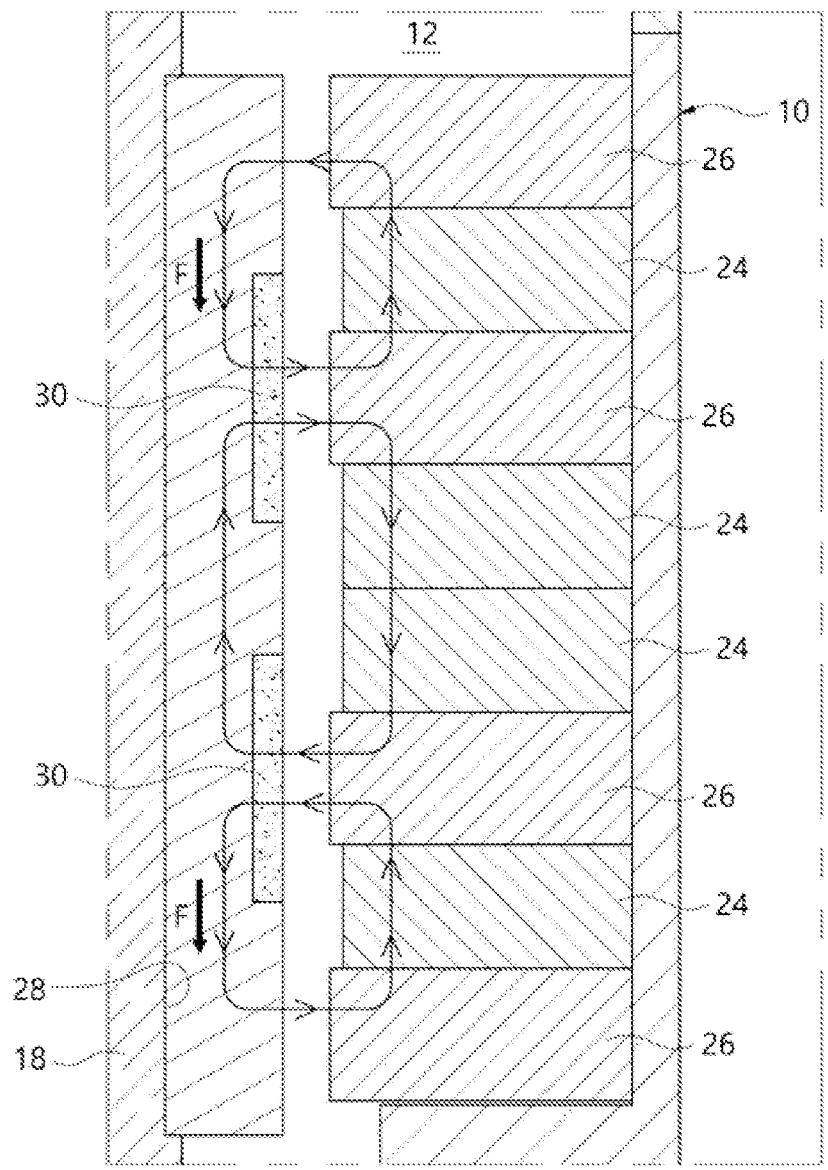
FIG. 3 is a sectional view illustrating the operation of a driving pin in the embodiment of the present disclosure.

Referring to FIGS. 2 and 3, an operation in which the driving pin 18 is moved will be described. In the illustrated embodiment, the magnetic field may be formed by magnetism of the permanent magnet 24, and the magnetic flux may flow in the magnetic field so as to form a closed curve as indicated by a solid arrow. The permanent magnet 24 may generate a magnetic flux in a direction indicated by a bold arrow in FIG. 3 according to the direction of a polarity thereof.

Accordingly, as illustrated in FIG. 3, due to each of the permanent magnets 24, a magnetic flux may flow through magnetic paths marked with rectangles. A magnetic path at the uppermost part relative to FIG. 3 may be formed in a counterclockwise direction. That is, the magnetic path may be formed such that a magnetic flux flows from the permanent magnet 24, through the outer iron core 26, the inner iron core 29, the coil 30, and the outer iron core 26, and flows to the initial permanent magnet 24.

A magnetic path may be formed in a clockwise direction by the second and third permanent magnets from the top such that a magnetic flux flows, and a magnetic path may be formed in a counterclockwise direction by a permanent magnet 24 located at the lowest side such that a magnetic flux flows. Of course, the direction of the magnetic flux may be reversed depending on how the polarity of the permanent magnet 24 is arranged.

In this state, when an electric current is applied to the coil 30, the force of moving the coil 30 may be generated. An electric current may be applied to the coil 30 located at an upper right side relative to FIG. 3 in a direction of the electric current going into the ground, and an electric current may be applied to the coil 30 located at a lower part relative to FIG. 3 in a direction of the electric current coming from the ground. Accordingly, when the electric currents are applied to the coils 30, forces moving the coils 30 in directions of arrows F may act on the coils 30 and thus the inner iron core 29 may be moved, so the driving pin 18 may be moved. This operation may move the driving pin 18 by generating force in the entirety of the driving pin 18 by the permanent magnet 24, the outer iron core 26, and the coil 30.

Accordingly, when an electric current is applied to the coil 30, the driving pin 18 may be moved, and as illustrated in FIG. 4, the driving pin 18 may protrude relatively to the outside of the housing 10.

In addition, when the electric current applied to the coil 30 is removed, the force according to Fleming's left hand rule may no longer act on the coil 30, and the elastic restoring force of the elastic member 20 may be supplied to the driving pin 18, so as illustrated in FIG. 5, the driving pin 18 may be moved to an initial position.

In the above, even if all the components constituting the actuator according the embodiment of the present disclosure are described as being integrally combined or being operated integrally in combination, the present disclosure is not necessarily limited to this embodiment. That is, within the scope of the objective of the present disclosure, all the components may operate in at least one selective combination. In addition, terms such as "include", "constitute", or "have" described above mean that the corresponding component may be inherent unless otherwise stated. Accordingly, the terms should not be construed as excluding other components, but as being able to further include other components. All terms including technical and scientific terms have the same meaning as commonly understood by those skilled in the art to which the present disclosure belongs, unless otherwise defined. Commonly used terms, such as terms defined in a dictionary, should be interpreted as being consistent with the contextual meaning of the related art, and are not interpreted in an ideal or excessively formal meaning unless explicitly defined in the present disclosure.

The above description is merely illustrative of the technical spirit of the present disclosure, and those skilled in the art to which the present disclosure pertains may make various modifications and variations without departing from the essential characteristics of the present disclosure. Accordingly, the embodiment disclosed in the present disclosure is for explaining rather than limiting the technical spirit of the present disclosure, and the scope of the technical spirit of the present disclosure is not limited to the embodiment. The protection scope of the present disclosure should be interpreted by the following claims, and all technical ideas within the scope equivalent thereto should be construed as being included in the scope of the present disclosure.

In the illustrated embodiment, the housing 10, the inner space 12, the guide 16, the permanent magnet 24, the outer iron core 26, and the inner iron core 29 may be described to have cylindrical shapes or ring shapes, but may not be limited thereto.

For example, the exterior of the housing 10 may not be circular, but may be hexahedral, and the inside of the guide 16 may also have a polygonal cross-section instead of a circular one.

The invention claimed is:

1. An actuator comprising:
a housing having an inner space defined therein;
a driving pin installed at a center of the housing by passing therethrough such that the driving pin moves rectilinearly;
an inner iron core installed at the driving pin and moving integrally with the driving pin when the driving pin moves;
a coil installed in a coil groove at the inner iron core and moving integrally with the driving pin;
a permanent magnet installed in the inner space of the housing and generating magnetism; and
an outer iron core forming a flow path of a magnetic flux coming from the permanent magnet in cooperation with the inner iron core, the outer iron core installed in the inner space such that the outer iron core faces the coil installed at the driving pin by being spaced apart by a predetermined distance from the coil,
wherein the inner iron core is installed in a pin groove formed at an outer surface of the driving pin, and the coil is installed at an outer surface of the coil groove of the inner iron core, and
wherein in the outer iron core and the permanent magnet, a set of permanent magnet and outer iron core in which the permanent magnet is provided at each of opposite sides of the outer iron core is repeatedly installed by being stacked,
wherein a guide is provided in the housing such that the guide guides the movement of the driving pin,
wherein a housing cap is installed at an end part of the housing such that the housing cap shields the inner space from outside, and
wherein a washer is installed at the driving pin protruding to the outside of the housing cap, and an elastic member is installed between the washer and the housing cap such that the elastic member supplies an elastic restoring force to the driving pin when an electric current is not applied to the coil.

2. The actuator of claim 1, wherein the outer iron core is located at an end part of each of opposite sides at which the outer iron cores and the permanent magnets are arranged by being stacked.

3. The actuator of claim 2, wherein the magnetic flux generated from the permanent magnet located at each of the opposite sides of the outer iron core passes through the coil facing the outer iron core.

4. The actuator of claim 1, wherein the outer iron core is located at an end part of each of opposite sides at which the outer iron cores and the permanent magnets are arranged by being stacked.

5. The actuator of claim 4, wherein the magnetic flux generated from the permanent magnet located at each of the opposite sides of the outer iron core passes through the coil facing the outer iron core.

6. The actuator of claim 1, wherein the outer iron core is located at an end part of each of opposite sides at which the outer iron cores and the permanent magnets are arranged by being stacked.

7. The actuator of claim 6, wherein the magnetic flux generated from the permanent magnet located at each of the opposite sides of the outer iron core passes through the coil facing the outer iron core.

8. The actuator of claim 1, wherein the outer iron core is located at an end part of each of opposite sides at which the outer iron cores and the permanent magnets are arranged by being stacked.

9. The actuator of claim 8, wherein the magnetic flux generated from the permanent magnet located at each of the opposite sides of the outer iron core passes through the coil facing the outer iron core.

* * * * *